United States Patent Office 3,482,940
Patented Dec. 9, 1969

3,482,940
HIGH PRESSURE PREPARATION OF
YTTRIUM SESQUICARBIDE
Milton C. Krupka, Angelo L. Giorgi, Nerses H. Krikorian, and Eugene G. Szklarz, Los Alamos, N. Mex., assignors to the United States of America as represented by the United States Atomic Energy Commission
No Drawing. Filed Feb. 23, 1968, Ser. No. 707,476
Int. Cl. C01b 31/30
U.S. Cl. 23—208
1 Claim

ABSTRACT OF THE DISCLOSURE

A method of preparing stable body-centered cubic yttrium sesquicarbide in which yttrium carbide is arc melted and then subjected to a pressure of about 20 kilobars, a temperature of about 1300° C. for a period of about 5 minutes, and then temperature quenched to ambient temperature at this elevated pressure.

---

The invention described herein was made in the course of, or under, a contract with the U.S. Atomic Energy Commission.

The inventors have discovered that one of the inherent properties of body-centered cubic yttrium sesquicarbide prepared using the process of this invention is that the carbide becomes superconducting at a temperature of about 8° K. This discovery of superconductivity was not predictable but opens a wide range of utility for the fabricated sesquicarbide as a superconducting element.

It is well known in the prior art that the sesquicarbides of the lanthanide series of elements could be formed in the body-centered cubic crystal structure by arc melting the said carbide. The inventors tried to form body-centered cubic yttrium sesquicarbide using the arc melting technique, and were unsuccessful. They further discovered the body-centered cubic yttrium sesquicarbide can only be made by subjecting the arc-melted carbide to the additional steps of pressuring to about 15 kilobars and a temperature of about 1300° C. and then temperature quenching to ambient.

Furthermore, the body-centered cubic structure denoted as D5$_c$, the crystal structure associated with yttrium sesquicarbide prepared using this invention, has not previously been shown to be superconducting and, in fact, this crystal structure has not been demonstrated to be a superconductor for any combination of elements. Subsequent to the discovery of superconductivity of cubic yttrium sesquicarbide, body-centered cubic lanthanum sesquicarbide normally prepared by arc melting was also examined and found to be superconducting in a temperature range of 5.5–10.0° K. It was further found that the lanthanum sesquicarbide is stable at ambient temperature without subjecting it to a temperature quench under high pressure.

It is therefore an object of this invention to provide a novel method for the preparation of body-centered cubic yttrium sesquicarbide that is stable at ambient temperature and pressure.

Other objects and advantages of this invention will be apparent from the following description of the preferred embodiment.

An arc-melted material of nominal composition YC$_{1.2}$ to YC$_{1.5}$ is subjected to pressures in the range of 15–25 kilobars, temperatures of 1250–1350° C., for a period of 3–6 minutes. Conversion to Y$_2$C$_3$ in yields in excess of 90% occurs. The yttrium sesquicarbide as produced is an unstable compound as the temperature and pressure are permitted to reduce to ambient. It can, however, be retained as a stable compound at ambient conditions by a temperature quench while maintaining the pressure of between 15–25 kilobars.

One of the inherent qualities of body-centered cubic yttrium sesquicarbide is that at temperatures ranging from 7.5–10.5° K. this compound becomes a superconductor. The superconducting transition temperature is a variable dependent upon the precise chemical composition of the compound.

The above-stated method of preparing yttrium sesquicarbide is critical as regards the temperature quench under high pressure since without this step the carbide will not remain stable at room temperature or ambient conditions.

Using the method stated in the preferred embodiment of this invention the following characteristics are obtained.

(1) Yields in excess of 90% Y$_2$C$_3$ can be obtained under the prescribed conditions as appraised from X-ray diffraction patterns.

(2) The compound has a significant homogeneity range.

(3) This crystal structure can only be retained from a high temperature quench under pressure.

What is claimed is:

1. A method of preparing body-centered cubic yttrium sesquicarbide in which a composition YC$_{1.2}$ to YC$_{1.5}$ is arc-melted and wherein the improvement comprises subjecting the melted material to pressures in the range of 15–25 kilobars, temperatures of 1250–1350° C. for a period of 3–6 minutes, and then temperature quenching at this elevated pressure.

References Cited

UNITED STATES PATENTS 3,311,554    3/1967    McCurdy.

OTHER REFERENCES

J. Am. Chem. Soc., 80, pp. 4499–4503 (1958).

OSCAR R. VERTIZ, Primary Examiner
G. T. OZAKI, Assistant Examiner